United States Patent [19]

Boyer et al.

[11] 4,162,207

[45] Jul. 24, 1979

[54] PROCESS FOR THE CONVERSION OF SULFUR DIOXIDE

[76] Inventors: Stephen K. Boyer, 339 Wayne Ave., Springfield, Pa. 19064; Steven M. Slater, 1 Garden Ct., Cambridge, Mass. 02138

[21] Appl. No.: 939,220

[22] Filed: Sep. 5, 1978

[51] Int. Cl.$^2$ .............................................. B01J 1/10
[52] U.S. Cl. .......................................... 204/157.1 R
[58] Field of Search ............... 204/157.1 R, DIG. 1

[56] References Cited

U.S. PATENT DOCUMENTS

| | | | |
|---|---|---|---|
| 4,008,136 | 2/1977 | Williams | 204/157.1 R |
| 4,097,349 | 6/1978 | Zenty | 204/157.1 R |
| 4,110,183 | 8/1978 | Furuta et al. | 204/157.1 R |

*Primary Examiner*—Howard S. Williams
*Attorney, Agent, or Firm*—Joseph J. Ruch, Jr.

[57] ABSTRACT

A process is described for the conversion of sulfur dioxide into sulfur trioxide, and derivatives of sulfur trioxide, such as sulfuric acid. The process is particularly efficient for removing sulfur dioxide from stack gas, such as exhaust and waste gas associated with industrial processes, such as chemical processes, combustion of coal and oil, and processes for treating liquid and solid wastes.

12 Claims, No Drawings

PROCESS FOR THE CONVERSION OF SULFUR DIOXIDE

BACKGROUND OF THE INVENTION

1. Field of the Invention

The process of the invention relates to the conversion of sulfur dioxide to sulfur trioxide, and derivatives of sulfur trioxide, including sulfuric acid. The process is useful for removing sulfur dioxide from stack gas, such as exhaust and waste gas effluents associated with various industrial processes, such as: (1) chemical processes; (2) combustion of coal and oil; and (3) processes for treating liquid and solid wastes.

2. Description of the Prior Art

The presence of sulfur dioxide in the atmosphere has become a matter of great importance in recent times. Sulfur dioxide is now a serious contaminant in the atmosphere, and can adversely affect both living and inanimate objects which are exposed to it, both as sulfur dioxide per se, and as sulfuric acid, to which sulfur dioxide may ultimately be converted under certain atmospheric conditions. See, e.g., Bufalini, Environmental Science and Technology, Vol. 5, pages 685–699 (1971); Sidebottom et al, Environmental Science and Technology, Vol. 6, pages 72–79 (1972); and Bricard and Vigla, Canadian Journal of Chemistry, Vol. 52, pages 1485–1490 (1974). Although it is well known that sulfur dioxide can be oxidized in the atmosphere, the intermediate species involved and the reaction paths remain open to question.

Since sulfur dioxide is produced as a gaseous by-product in many chemical reactions which are useful to modern society, the removal of sulfur dioxide from gaseous effluents has become the subject of intensive investigations. The chemical reactions which produce the sulfur dioxide are many in number, including: (1) industrial processes; (2) the process of combustion of coal and oil containing sulfur compounds as minor constituents, such as by electric power generating plants; and (3) various processes for treating liquid and solid wastes. Most often the sulfur dioxide is just a minor constituent of the gaseous effluent from the process. Such gaseous effluents are commonly referred to as stack or flue gas.

Many processes have been devised in the attempt to economically and efficiently remove sulfur dioxide from stack gas. The most widely used method, involving wet limestone scrubbing, generates large amounts of a waste sludge including gypsum, calcium sulfite, and fly ash. Desirably, the process for removing sulfur dioxide should produce useful by-products without producing other waste materials.

Other processes for removing sulfur dioxide from stack gases, and for converting sulfur dioxide to other substances, involving reactions with various other intermediates and catalysts, are known. Thus U.S. Pat. No. 3,251,649, issued May 17, 1976, describes a process in which a waste gas containing sulfur oxides is contacted with a water suspension of manganese oxide to form manganese sulfate, which is then treated with hydrogen chloride to form sulfuric acid. Through a series of subsequent reactions, the manganese oxide is ultimately regenerated. U.S. Pat. No. 3,615,196, issued Oct. 26, 1971, describes removal of sulfur dioxide from flue gas by means of vanadium pentoxide catalyst absorbent; the process is carried out at high temperature, e.g., 1,000° C. See also U.S. Pat. Nos. 3,987,153, issued Oct. 19, 1976, and 4,012,487, issued Mar. 15, 1977, which describe methods for removing sulfur dioxide from exhaust gases, involving complex reactions with special catalysts and intermediates.

Processes have been devised for conversion of sulfur dioxide using oxygen in the form of ozone, as described in South African Pat. No. 69 07638, May 27, 1970, or by a combination conversion technique employing both ozone and manganese oxide catalyst, as described in U.S. Pat. No. 3,574,562, issued Apr. 13, 1971. Although these patents indicate that oxygen can react directly with sulfur dioxide while in the highly reactive form of ozone, ozone oxidation of sulfur dioxide is not favored economically because of the relatively high energy input and low ozone output of ozone generating equipment. Although reactive oxygen in the form of ozone (triatomic oxygen) can be prepared by other techniques, these techniques have drawbacks which hinder their utilization for the removal of sulfur dioxide from stack gas.

Oxygen normally exists as a diatomic molecule in the triplet electronic state. Diatomic oxygen is also known to exist in an electronically excited singlet state. Singlet oxygen can be generated by photolytic techniques involving use of oxygen-photosensitizing dyes. Known physical and chemical properties of singlet oxygen are described, for instance, by Kearns, D. R., Chemical Reviews, Vol. 71, pages 395–427 (1971). Singlet oxygen is known to react with certain diene, aromatic, and olefin compounds. U.S. Pat. No. 4,008,136, issued Feb. 15, 1977, describes singlet oxygen generated using an oxygen-photosensitizing dye attached to a polymer support, and its reaction with: (1) 2-methyl-2-butene to form 3-methylbut-3-ene-2-ol and 2-methylbut-3-ene-2-ol; (2) anthraceneto form anthracene endoperoxide; (3) 2,3-diphenyl-p-dioxene to form 1,2-ethanediol dibenzoate; and (4) sewage water, and the reduction in the coliform count resulting therefrom. The reactivity of singlet oxygen with other substances is largely unknown.

SUMMARY OF THE INVENTION

The process of the invention involves converting sulfur dioxide to sulfur trioxide, and derivatives of sulfur trioxide such as sulfuric acid, by exposing an oxygen-photosensitizing substance to activating radiation in the presence of oxygen and sulfur dioxide. It is preferred that the process be carried out in an aqueous medium, such as an aqueous liquid or an aqueous coating on a solid support.

DETAILED DESCRIPTION OF THE INVENTION

In the process of the invention, an oxygen-photosensitizing substance is exposed to activating radiation in the presence of oxygen. Although we do not intend to be bound by a particular theoretical explanation, we do believe that the oxygen-photosensitizing substance absorbs the radiation, and in turn transfers this energy to oxygen molecules in the triplet ground state to form oxygen molecules in the singlet excited state. In turn, the singlet oxygen is believed to react with sulfur dioxide to form sulfur trioxide. In the preferred aqueous medium, the sulfur trioxide reacts to form a solution of sulfuric acid.

A variety of substances can function as oxygen-photosensitizers, including various dyes, such as rose bengal, methylene blue, and so forth.

In one embodiment of the invention, the oxygen-photosensitizing substance is a dye selected from the the group consisting of rose bengal, eosin Y, alizarin red S, congo red, orange G, methylene blue, crystal violet, proflavine sulfate, neutral red, and pyronin B.

For instance, in one preferred embodiment of the invention (see Example 5), an aqueous solution containing a low concentration of methylene blue, through which oxygen and a stack gas containing sulfur dioxide are bubbled, is exposed to activating radiation. Although all details of the reaction are not clear, and no reliance is placed on a particular reaction mechanism, it is believed that the methylene blue absorbs the energy of the activating radiation, transfers this energy to oxygen molecules in the triplet (ground) electronic state to form singlet (excited) oxygen molecules. The singlet oxygen is believed to react with the sulfur dioxide, converting it to sulfur trioxide, which in the presence of water forms sulfuric acid. When methylene blue is used as the oxygen-photosensitizing substance in an aqueous solution, the methylene blue may be decolorized during the reaction by the sulfuric acid solution formed in the process.

In another preferred embodiment of the invention (see Example 6), an aqueous solution containing a low concentration of rose bengal through which oxygen and a stack gas containing sulfur dioxide are bubbled is exposed to activating radiation. Rose bengal is not decolorized by the sulfuric acid solution formed in the process, and this may account in part for its apparently greater efficiency in converting sulfur dioxide when compared to methylene blue.

The sulfuric acid solutions formed during the process can be used for many purposes as is, i.e., without removal of the oxygen-photosensitizing dye, since the dye is typically present at a low concentration which will not interfere with many utilities of sulfuric acid. If desired, however, the dye can be removed from the sulfuric acid solution by treating the sulfuric acid solution with activated carbon, e.g., passing the sulfuric acid solution through a Norite (trademark) activated carbon containing column.

The dye concentration can be varied over a wide concentration without adversely affecting the process, but it is generally desirable to use only as much as is necessary to conduct the process efficiently. Typically, the dye concentration in an aqueous solution may be between about 5 mg/250 ml $H_2O$ and about 100 mg/250 ml $H_2O$, and preferably the dye concentration is between 10 mg/250 ml $H_2O$ and 50 mg/250 ml $H_2O$.

In other embodiments of the invention, the oxygen-photosensitizing substance can be attached to a substrate. In this embodiment the sulfuric acid solution formed in the process can be conveniently separated from the oxygen-photosensitizing substance on the substrate, which can then be reused. In the case of oxygen-photosensitizing dyes, the dyes are conveniently attached to polymeric substrates, such as those described in U.S. Pat. No. 4,008,136, issued Feb. 15, 1977.

Activating radiation useful in the process of the invention includes electromagnetic radiation in the wavelength range between 320 nm and 800 nm. Many well-known light sources produce satisfactory radiation in this wavelength range to be useful in the process of the invention, such as, for instance, mercury vapor lamps and tungsten filament lamps. A preferred source of radiation between 320 nm and 800 nm is sunlight.

In preferred embodiments of the invention, the process is carried out in an aqueous medium, such as the dye-containing solutions described above, in which the reacting gases are bubbled through the solution. Other variations employing an aqueous medium containing an oxygen-photosensitizing dye may also be used. For example, an aqueous dye-containing mist may be sprayed into a reaction chamber containing oxygen, through which a stack gas containing sulfur dioxide is passing, forming droplets of sulfuric acid which descend and and are collected at the bottom of the reaction chamber to form a sulfuric acid solution. Alternatively, the dye-containing aqueous solution can be made to flow over predetermined pathways within a reaction chamber containing oxygen, through which the stack gas is passing. Other variations will occur to those skilled in the art.

In preferred embodiments of the invention, the process is conducted continuously. For instance, in one embodiment oxygen and the aqueous medium containing the oxygen-photosensitizing substance are continuously introduced into a reaction chamber through which the stack gas containing the sulfur dioxide is passing. The mixture of stack gas, oxygen, and aqueous medium are exposed to activating radiation, as previously described, and the sulfuric acid solution formed in the process, containing the oxygen-photosensitizing substance, is continuously withdrawn from the chamber. If the oxygen-photosensitizing substance is a dye, the dye can be removed, if desired, by treatment with activated carbon.

In another embodiment of the invention, oxygen and water can be continuously introduced into a chamber containing an oxygen-photosensitizing substance attached to a substrate, while passing a stack gas containing sulfur dioxide through the chamber in such a manner that the water, oxygen, and stack gas are mixed in proximity to the substrate. The mixture is exposed to activating radiation, and the sulfuric acid solution formed in the process is continuously removed from the chamber. The oxygen-photosensitizing substance remains in the chamber attached to the substrate, where the conversion of sulfur dioxide to sulfur trioxide, forming sulfuric acid, occurs continuously during exposure to activating radiation.

In the following examples, samples of gas mixtures containing sulfur dioxide were passed through a photochemical reactor, during which time the sample gas mixtures were treated according to the process of the invention. As the results in Tables I and II show, conversion of sulfur dioxide can be achieved in a variety of embodiments.

The sample gas mixtures treated in each of the examples were prepared by simultaneously and continuously admitting purified argon, sulfur dioxide, and oxygen into a common pipe at predetermined rates, such that the concentration of sulfur dioxide was maintained at about 1800 parts per million (ppm), and the concentration of oxygen was maintained at a level greater than that stoichiometrically necessary to completely react with the sulfur dioxide. The sample gas mixtures were conducted through the common pipe to the photochemical reactor.

The photochemical reactor included a cylindrically-shaped reaction chamber encircling a generally cylindrical quartz mercury-vapor lamp, with a water cooling jacket interposed between the reaction chamber and the lamp. The common pipe was connected to a gas inlet opening at the base of the reaction chamber, and a gas outlet opening was located at the top of the reaction chamber.

The reacted gas mixtures were conducted from the gas outlet opening of the reaction chamber to a cold trap maintained at $-80°$ C. to remove any sulfur trioxide which might have been present. The gas mixtures were then conducted to a second cold trap maintained at $0°$ C., to ensure constant temperature, and finally to an infrared spectrophotometer, where the conversion of sulfur dioxide was monitored by comparing the concentration of sulfur dioxide in the reacted gas mixtures with the initial sulfur dioxide concentration.

EXAMPLE 1

In this example a sample gas mixture as described above was passed through the reaction chamber containing rose bengal attached to water saturated polymeric sheets while being exposed to activating radiation from the quartz mercury-vapor lamp. The flow rate was 1400 cc/min., resulting in a residence time within the reaction chamber of about 10 seconds. After beginning the exposure, there was initially a temporary increase in the sulfur dioxide concentration of the outlet gas, believed to be due to desorption of sulfur dioxide from the polymer sheets caused by a rise in temperature effected by operation of the lamp. The sulfur dioxide concentration in the outlet gas decreased, and after about 50 minutes reached a condition with about a 9% reduction in the sulfur dioxide concentration. The results are summarized in Table I.

EXAMPLE 2

In this example the sample gas mixture was treated by the process as described in Example 1, again using rose bengal on water saturated polymeric sheets as the oxygen-photosensitizing substance, except that the gas flow rate was decreased to about 510 cc/min., resulting in a residence time of about 29 seconds. After a period of about 80 minutes, a 17% decrease in the sulfur dioxide concentration was observed. The results are summarized in Table I.

EXAMPLES 3 AND 4

In Example 3, the sample gas mixture was treated by the process as described in Example 2, except that the rose bengal was adsorbed on polymeric beads forming a fluidized reaction bed within the reaction chamber, with a residence time of about 0.1 second.

In Example 4, the sample gas mixture was treated by the process as described in Example 1, except that the rose bengal was attached to polymeric beads forming a packed reaction bed in the reaction chamber, with a residence time of about 4 seconds.

From the foregoing examples, summarized below in Table I, it is apparent that appreciable decreases in sulfur dioxide concentrations can be achieved by use of an oxygen-photosensitizing dye attached to a polymeric substrate. Control samples, run under the conditions as described in Examples 1–4, except that no dye was included, exhibited no more than a 1% decrease in sulfur dioxide concentration.

In the event that it is desired to remove additional sulfur dioxide from the once-treated sulfur dioxide-containing mixtures, this can be accomplished by recycling the treated gas mixtures through the reactor one or more additional times.

TABLE I

| Time (min.) from beginning of exposure | % Conversion of $SO_2$ Example | | | |
|---|---|---|---|---|
| | 1 | 2 | 3 | 4 |
| 5 | — | — | — | — |
| 10 | — | — | — | 0 |
| 15 | — | — | 1 | 0 |
| 20 | — | — | 2 | 0 |
| 25 | — | — | 2 | |
| 30 | 3 | — | 2 | |
| 35 | 5 | — | | |
| 40 | 6 | — | | |
| 45 | 8 | 5 | | |
| 50 | 9 | 7 | | |
| 55 | | 11 | | |
| 60 | | 13 | | |
| 70 | | 15 | | |
| 80 | | 17 | | |
| 90 | | 17 | | |
| 100 | | | | |

The following Examples, 5 and 6, show preferred embodiments of the invention, in which the process of the invention is carried out in an aqueous medium by filling the reaction chamber of the photochemical reactor with water. The sample gas composition was bubbled into the aqueous medium through a glass frit at the gas inlet opening.

EXAMPLE 5

In this example a photochemical reactor as described above was employed, with the reaction chamber containing water in which a small amount of methylene blue was dissolved (20 mg/250 ml $H_2O$), and water was allowed to flow through the water jacket prior to irradiation of the reaction chamber by the lamp. The sample gas mixture was bubbled through the reaction chamber at 510 cc/min., with a residence time of seconds. As is shown in Table II, 62% conversion of the sulfur dioxide was achieved.

EXAMPLE 6

In this example the process as described in Example 5 was repeated, except that rose bengal was substituted for methylene blue. As is shown in Table II, an extremely high maximum conversion rate of 86% was achieved, after a period of only 20 minutes.

A control example was also run using water without dye in the reaction chamber. As is shown in Table II, the reduction in the sulfur dioxide concentration was greatly inferior to that achieved using the process of the invention, approaching only a 42% removal after a period of two hours.

TABLE II

| Time (min.) from beginning of exposure | % Conversion of $SO_2$ Example | | |
|---|---|---|---|
| | 5 | 6 | Control |
| 5 | 3 | 42 | — |
| 10 | 13 | 70 | — |
| 15 | 24 | 82 | 1 |
| 20 | 29 | 86 | 5 |
| 25 | 33 | 86 | 8 |
| 30 | 37 | 86 | 10 |
| 35 | 41 | | 12 |
| 40 | 45 | | 14 |
| 45 | 48 | | 18 |
| 50 | 51 | | 22 |
| 55 | 54 | | 24 |
| 60 | 56 | | 25 |
| 70 | 58 | | 29 |
| 80 | 60 | | 32 |

TABLE II-continued

| Time (min.) from beginning of exposure | % Conversion of SO$_2$ Example | | |
|---|---|---|---|
| | 5 | 6 | Control |
| 90 | | 62 | 35 |
| 100 | | | 38 |
| 110 | | | 40 |
| 120 | | | 42 |

The invention has been described in detail with reference to certain preferred embodiments thereof, but it is understood that variations and modifications can be effected within the spirit and scope of the invention.

What is claimed is:

1. A process for converting sulfur dioxide to sulfur trioxide, comprising exposing an oxygen-photosensitizing substance to activating radiation in an aqueous medium in the presence of oxygen and sulfur dioxide.

2. A process as in claim 1 wherein the oxygen-photosensitizing substance is a dye selected from the group consisting of rose bengal, eosin Y, alazarin red S, congo red, orange G, methylene blue, crystal violet, proflavine sulfate, neutral red, and pyronin B.

3. A process as in claim 2 wherein the dye is rose bengal or methylene blue.

4. A process for removing sulfur dioxide from stack gas by converting it to sulfur trioxide in the presence of water to form sulfuric acid, comprising
mixing the stack gas with oxygen and an aqueous medium containing an oxygen-photosensitizing substance while exposing the mixture thus formed to activating radiation.

5. A process as in claim 4 wherein the oxygen-photosensitizing substance is a dye selected from the group consisting of rose bengal, eosin Y, alizarin red S, congo red, orange G, methylene blue, crystal violet, proflavine sulfate, neutral red, and pyronin B.

6. A process as in claim 5 wherein the dye is rose bengal or methylene blue.

7. A process for removing sulfur dioxide from stack gas by converting it to sulfur trioxide in the presence of water to form sulfuric acid, comprising
continuously introducing oxygen and an aqueous medium containing an oxygen-photosensitizing substance into a chamber through which the stack gas is passing,
mixing the stack gas, oxygen, and aqueous medium in the chamber while exposing the mixture thus formed to activating radiation, and
continuously removing the sulfuric acid solution formed in the process from the chamber.

8. A process as in claim 7 wherein the oxygen-photosensitizing substance is a dye selected from the group consisting of rose bengal, eosin Y, alizarin red S, congo red, orange G, methylene blue, crystal violet, proflavine sulfate, neutral red, and pyronin B.

9. A process as in claim 8 wherein the dye is rose bengal or methylene blue.

10. A process as in claim 9 wherein the sulfuric acid solution is treated with activated carbon to remove the dye therefrom.

11. A process for removing sulfur dioxide from stack gas by converting it to sulfur trioxide in the presence of water to form sulfuric acid, comprising
continuously introducing water and oxygen into a chamber containing an oxygen-photosensitizing substance attached to a substrate while passing the stack gas through the chamber in such a manner that the water, oxygen, and stack gas are mixed in proximity to the substrate,
exposing the mixture thus formed to activating radiation, and
continuously removing the sulfuric acid solution formed in the process from the chamber.

12. A process as in claim 11 wherein the substrate is a polymeric substrate.

* * * * *